United States Patent [19]
Booth

[11] Patent Number: 5,980,968
[45] Date of Patent: *Nov. 9, 1999

[54] CONTROLLED-RELEASE FORMULA FOR PERFORMANCE DRINKS

[76] Inventor: Garcia Paul Booth, 803 E. Ellis St., Jefferson City, Tenn. 37760

[*] Notice: This patent issued on a continued prosecution application filed under 37 CFR 1.53(d), and is subject to the twenty year patent term provisions of 35 U.S.C. 154(a)(2).

[21] Appl. No.: 08/728,056

[22] Filed: Oct. 9, 1996

[51] Int. Cl.$^6$ .................................................. A23L 2/00
[52] U.S. Cl. ......................... 426/590; 426/72; 426/74; 426/601; 426/658; 426/650; 426/661; 426/656
[58] Field of Search ......................... 426/590, 658, 426/661, 650, 656, 72, 74, 601

[56] References Cited

U.S. PATENT DOCUMENTS

| | | | |
|---|---|---|---|
| 4,084,012 | 4/1978 | Krumel et al. | 426/590 |
| 4,264,638 | 4/1981 | Sirett et al. | 426/590 |
| 4,530,850 | 7/1985 | Trop | 426/590 |
| 5,114,723 | 5/1992 | Stray-Gundersen | 426/590 |
| 5,178,896 | 1/1993 | Langner | 426/590 |
| 5,587,190 | 12/1996 | Guezennec et al. | 426/590 |

*Primary Examiner*—Helen Pratt

[57] ABSTRACT

Sport drinks, performance drinks, electrolyte drinks and the like are made from at least one carbohydrate and at least two biodegradable polymers selected from the group consisting of copolymers of sucrose and epichlorohydrin having molecular weights of from 70,000 to 400,000, glucose polymers having molecular weights of from 10,000 to 300,000, polyethylene glycols having molecular weights of from 1000 to 100,000, polyvinyl alcohols having molecular weights of from 70,000 to 110,000, polysucrose, hydroxymethyl cellulose, hydroxyethyl cellulose, hydroxypropyl cellulose, hydroxypropyl-methyl cellulose, hydroxypropylethyl cellulose, sodium carboxymethyl cellulose, gelatine, starch, crosslinked starch, methoxypolyethylene glycol, ethoxypolyethylene glycol, polyethylene oxide, polyoxyethylene, polyoxypropylene, block copolymers of polyoxyethylene and polyoxypropylene, lecithin and lysolecithin. Preferred polymers are polyethylene glycol and a copolymer of sucrose and epichlorohydrin.

7 Claims, No Drawings

CONTROLLED-RELEASE FORMULA FOR PERFORMANCE DRINKS

TECHNICAL FIELD

The present invention relates to improved oral delivery of quick energy foods into the body. In particular it relates to so-called sport drinks, performance drinks, electrolyte drinks, and the like.

BACKGROUND TO THE INVENTION

It is believed that improved sports performance can be attained by the intake of so-called sport drinks. They often contain fructose or other sugars, and complex carbohydrates, which are easily absorbed by the body, and are designed to promote the availability of energy and/or prevent or treat mild dehydration. The main problem with glucose, fructose and glucose polymer drink formulae is that they maintain energy levels for a very short time period, e.g. about 15 to 30 minutes. Sports enthusiasts are therefore are compelled to take booster doses of the drink every so often to help maintain their energy for an extended time period. This problem adds considerable inconvenience to the sports enthusiasts as they are required to drink at intervals during long periods of exercise.

In order to overcome this problem of frequent drink administration to athletes and other sports enthusiasts to maintain the required energy levels, it is desirable to design a drink formula that may be drunk prior to the beginning of exercise or the sport event and which will provide energy levels for an extended time period, e.g. 3 or more hours.

The present invention seeks to provide a solution to the above mentioned problem.

The present invention is also useful for other kinds of drinks where extending the release of energy from the drink ingredients is desirable. For example, it is desirable for the elderly and for babies, that fewer drinks be taken than are currently the norm in order to give the same amount of energy. One advantage is that care providers spend less time feeding the elederly and young. Other types of drinks that benefit from the present invention are food supplements, so-called performance drinks, post-exercise drinks (recovery drinks) and drinks for use with cereals (breakfast drink).

Molecular weights indicated herein are weight average molecular weights (Mw)and can be determined by known light scattering methods or gel filtration chromatography methods. Light scattering methods are preferred.

SUMMARY OF THE INVENTION

Accordingly the present invention provides a drink formulation, at least one carbohydrate and at least two biodegradable polymers selected from the group consisting of copolymers of epichlorohydrin and sucrose having molecular weights of from 70,000 to 400,000, glucose polymers having molecular weights of from 10,000 to 300,000, polyethylene glycols having molecular weights of from 1000 to 100,000, polyvinyl alcohols having molecular weights of from 70,000 to 110,000, polysucrose, hydroxymethyl cellulose, hydroxyethyl cellulose, hydroxypropyl cellulose, hydroxypropyl-methyl cellulose, hydroxypropyl-ethyl cellulose, sodium carboxymethyl cellulose, gelatine, starch, crosslinked starch, polyethyleneimine, methoxypolyethylene glycol, ethoxypolyethylene glycol, polyethylene oxide, polyoxyethylene, polyoxypropylene, block copolymers of polyoxyethylene and polyoxypropylene, polyoxyethylene X-lauryl ether wherein X is from 9 to 20, polyvinyl pyrrolidone, polyoxyethylene sorbitan esters, gelatine, starch, crosslinked starch, methoxypolyethylene glycol, ethoxypolyethylene glycol, polyethylene oxide, polyoxyethylene, polyoxypropylene, block copolymers of polyoxyethylene and polyoxypropylene, lecithin and lysolecithin.

In one embodiment the biodegradable polymers selected from the group consisting of copolymers of epichlorohydrin and sucrose having molecular weights of from 70,000 to 400,000, glucose polymers having molecular weights of from 10,000 to 300,000, polyethylene glycols having molecular weights of from 1000 to 100,000, polyvinyl alcohols having molecular weights of from 70,000 to 110,000, polysucrose, gelatine, starch, crosslinked starch, methoxypolyethylene glycol, ethoxypolyethylene glycol, polyethylene oxide, polyoxyethylene, polyoxypropylene, block copolymers of polyoxyethylene and polyoxypropylene, lecithin and lysolecithin.

In a further embodiment the biodegradable polymers are present in an amount of from 0.8 to 5% of the drink formulation, preferably from 0.8 to 2.5% and even more preferably from 0.8 to 2.0%.

In one embodiment the carbohydrate is at least one sugar selected from the group consisting of fructose, sucrose, dextrose and glucose.

The preferred biodegradable polymers are a copolymer of sucrose and epichlorohydrin and polyethylene glycol. In one embodiment the polymers are polyethylene glycol having a molecular weight of from 2000 to 20,000 and a copolymer of sucrose and epichlorohydrin.

It will be understood that the drink may be in concentrated form, e.g. powder or liquid form, depending on the specific ingredients used. Liquid forms usually contain water. Powder forms are usually dissolved in water prior to ingestion.

The drink may also include other ingredients, for example simple and complex carbohydrates, vitamins, aminoacids, minerals, electrolytes, antioxidants, flavouring agents, colouring agents, proteins, oils and fats.

In one embodiment the complex carbohydrates are selected from the group consisting of corn, wheat, oats and rice.

In another embodiment the drink contains stabilizers and/or absorption enhancers, e.g. oleic acid, linoleic acid, cholic acid, chenodeoxycholic acid, mono-olein and sodium deoxycholate.

In a further embodiment the drink contains at least one antioxidant selected from the group consisting of ascorbic acid, tocopherol, citric acid, sodium phosphate, sodium benzoate, phosphoric acid, brominated vegetable oils, sodium citrate, beta-carotene and butylated hydroxy toluene (BHT).

In yet another embodiment the drink contains an edible oil selected from the group consisting of mineral oil, soyabean oil, coconut oil, vegetable oil, sunflower oil and combinations thereof.

In yet another embodiment the edible oil is present in an amount of from 1 to 2% of the drink formulation.

DETAILED DESCRIPTION OF PREFERRED EMBODIMENTS

As indicated hereinbefore, it is desirable to extend the time for the release of energy from drink ingredients. As will be known to those skilled in the art, the exact composition of a drink depends to a large extent on its purpose. For this reason, for example drinks are formulated as sport drinks, performance drinks, electrolyte drinks and post-exercise drinks and nutritional supplements.

Electrolyte drinks may be relatively easily made with simple mixtures of ingredients, e.g. fructose, complex carbohydrates, sodium, potassium, magnesium and calcium salts. For example, one such drink may contain fructose, complex carbohydrates (maltodextrin), sodium chloride, potassium chloride, calcium chloride, magnesium sulphate, lemon flavour, colour and at least two biodegradable polymers useful in the present invention.

So-called sport drinks preferably do not contain carotene, vitamins or protein.

Drinks which are nutritional supplements may be more complex mixtures and include vitamins, minerals, vegetable oil, carbohydrates and proteins among other ingredients, in varying amounts, depending upon the therapeutic effect desired. One such supplement may contain water, hydroxylated cornstarch, sodium and calcium caseinates, corn oil, sucrose, protein isolate, magnesium chloride, potassium citrate, calcium phosphate tribasic, soy lecithin, flavour, sodium citrate, choline chloride, ascorbic acid, taurine, L-carnitive, zinc sulphate, ferrous sulphate, alpha-tocopherol acetate, niacinamide, carrageenin, calcium pantothenate, manganese sulphate, thiamine chloride hydrochloride, pyridoxine hydrochloride, riboflavin, copper sulphate, vitamin A palmitate, folic acid, biotin, sodium molybdate, chromium chloride, potassium iodide, sodium selenate, phylloquinone, cyanocobalamin, vitamins A, thiamin ($B_1$), riboflavin ($B_2$), $B_6$, $B_{12}$, D, D2, E and K, folic acid, niacin, choline, biotin, pantothenic acid and at least two biodegradable polymers useful in the present invention.

Another example of a drink of the present invention contains crystalline fructose, dextrose, maltodextrin, isolated soy protein, vegetable or animal protein, amino acids, potassium or sodium citrate, citric acid crystals, sodium chloride, vitamins, minerals, beta-carotene, glucose polymers, indoles, ascorbigens, vitamins and cereal grains, and at least two biodegradable polymers useful in the present invention.

It will be clear to those skilled in the art that there are numerous ingredients from which to select in formulating a drink and that the ingredient selection and the concentration of each ingredient will depend on the function of the drink. Some of these ingredients are shown in the above examples; others will be known to those skilled in the art.

The most suitable biodegradable polymers for use in the present invention are selected from the group consisting of copolymers of epichlorohydrin and sucrose having molecular weights of from 70,000 to 400,000, glucose polymers having molecular weights of from 10,000 to 300,000, polyethylene glycols having molecular weights of from 1000 to 100,000, polyvinyl alcohols having molecular weights of from 70,000 to 110,000, polysucrose, gelatine, starch, crosslinked starch, methoxypolyethylene glycol, ethoxypolyethylene glycol, polyethylene oxide, polyoxyethylene, polyoxypropylene, block copolymers of polyoxyethylene and polyoxypropylene, lecithin and lysolecithin.

The biodegradable polymers selected from the group consisting of hydroxymethyl cellulose, hydroxyethyl cellulose, hydroxypropyl cellulose, hydroxypropyl-methyl cellulose, hydroxypropyl-ethyl cellulose, sodium carboxymethyl cellulose, gelatine, starch, crosslinked starch, polyethyleneimine, methoxypolyethylene glycol, ethoxypolyethylene glycol, polyethylene oxide, polyoxyethylene, polyoxypropylene, block copolymers of polyoxyethylene and polyoxypropylene, polyoxyethylene X-lauryl ether wherein X is from 9 to 20, polyvinyl pyrrolidone, polyoxyethylene sorbitan esters, are not as suitable as the polymers mentioned in the paragraph above, partly because they are not as soluble in cold water and therefore tend to be difficult to dissolve.

The preferred biodegradable polymers are polyethylene glycol and a copolymer of sucrose and epichlorohydrin.

Ideally, the formulation should be formulated without stabilizers or absorption agents, because with some formulations they have a tendency to cause stomach cramping and diarrhoea.

An advantage of the present drink is that it provides a gradual release of fuel into the body and is therefore more beneficial to performance and easier on the body than presently available drinks which give a quicker release of energy. Another advantage for sport drinks is that it allows athletes to consume just water on the race course without upsetting the stomach with course sponsor's drinks that the athlete may not have tried before. For cyclists and marathoners and the like, the present drink also eliminates the inconvenience of having to carry drink, having to search for (and possibly drop) the drink bottle on the course. The present drink is extremely beneficial in competitions with back-to-back heats or races, or in tournaments or play-off events in which there are numerous competitions requiring a continuous replenishment of energy for recovery. The present drinks are convenient to athletes who want to get the right amount and quality of fuel without experiencing cramps from eating food too close to exercise or competition. Because the present drink continually disperses for several hours, only one drink is required.

The invention is exemplified by the following example.

EXAMPLE I

Four groups of eight 60–70 kg healthy, trained endurance athletes volunteers were selected for testing. Each of the four groups were administered a drink one hour before vigorous athletic activity. Their blood glucose levels were measured using an Accuchek-Easy (trade mark) glucometer at the beginning of the experiment and at hourly intervals.

The first group was given Drink A, the second was given Drink B, the third was given Drink C and the fourth was given Drink D.

Drink A was prepared as follows: a powdered sport drink was formulated from 54.78 parts by weight maltodextrin, 36.9 parts by weight crystalline fructose, 4.36 parts by weight crystalline citric acid, 1.4 parts by weight sodium chloride, 1.2 parts by weight dextrose, 0.9 parts by weight flavouring and 0.46 parts by weight potassium citrate. Several 45.7 g samples of the powder were each dissolved in 480 ml water.

Drink B was water.

Samples of Drink C were made from 45.7 g glucose in 480 ml water.

Drinks A, B anad C were for control purposes and are not covered by the present invention.

Drink D, which falls within the scope of the present invention, was prepared as follows: a powdered sport drink was formulated from 54.8 parts by weight dextrose, 36.65 parts by weight maltodextrin, 4.85 parts by weight crystalline citric acid, 0.8 parts by weight sodium chloride, 0.9 parts by weight flavouring, 1.0 parts by weight polyethylene glycol having a molecular weight of 8000 and 0.5 parts by weight FICOLL (trade mark) copolymer of sucrose and epichlorohyrin having a molecular weight range of from 70,000 to 400,000. Several 22.5 g samples of the powder (half the amount used in Drink A) were each dissolved in 480 ml water. Table I shows the average blood glucose levels for the four groups of athletes.

TABLE I

| | Blood glucose levels (mmol/L) | | | |
|---|---|---|---|---|
| Time (hr) | Drink A (Control) | Drink B (Water) | Drink C (Glucose) | Drink D (Invention) |
| 0 | 4.30 | 4.25 | 4.50 | 4.45 |
| 1 | 5.44 | 4.25 | 5.20 | 6.88 |
| 2 | 5.11 | 4.80 | 5.01 | 6.75 |
| 3 | 4.30 | 4.00 | 4.28 | 5.87 |
| 4 | 3.96 | 3.80 | 4.01 | 5.25 |

This shows that the present controlled-release formulation of Drink D, even at half the dose of Drink A maintained the blood glucose levels in the group of athletes over period of at least 3 hrs.

I claim:

1. A drink formulation comprising at least one carbohydrate and two biodegradable polymers wherein the polymers are a copolymer of sucrose and epichlorohydrin having a molecular weight of from 70,000 to 400,00 and polyethylene glycols having a molecular weight of from 1,000 to 100,000.

2. A drink formulation according to claim 1 wherein the biodegradable polymers are present in an amount of from 0.8 to 5% of the drink formulation.

3. A drink formulation according to claim 2 wherein the biodegradable polymers are present in an amount of from 0.8 to 2.0% of the drink formulation.

4. A drink formulation according to claim 2 which also contains material selected from the group consisting of vitamins, aminoacids, minerals, electrolytes, antioxidants, flavouring agents, colouring agents, proteins, oils and fats.

5. A drink formulation according to claim 4 wherein two of the biodegradable polymers are polyethylene glycol having a molecular weight of 2000 to 20,000 and a copolymer of sucrose and epichlorohydrin.

6. A drink formulation according to claim 1 wherein the carbohydrate is at least one sugar selected from the group consisting of fructose, sucrose, dextrose and glucose.

7. A drink formulation according to claim 1 which also contains material selected from the group consisting of vitamins, aminoacids, minerals, electrolytes, antioxidants, flavouring agents, colouring agents, proteins, oils and fats.

* * * * *